Aug. 2, 1966   W. J. FISHER   3,263,952
THERMOCOUPLE MOUNTING ASSEMBLY
Filed Oct. 5, 1964

INVENTOR.
WILLIAM J. FISHER
BY George L. Church
ATTORNEY

# United States Patent Office 3,263,952
Patented August 2, 1966

3,263,952
THERMOCOUPLE MOUNTING ASSEMBLY
William J. Fisher, Chester, Pa., assignor to Sun Oil Company, Philadelphia, Pa., a corporation of New Jersey
Filed Oct. 5, 1964, Ser. No. 401,508
5 Claims. (Cl. 248—309)

This invention relates to an assembly for mounting thermocouples, and more particularly for mounting such thermocouples on the tubes of tube-type furnaces.

In petroleum refineries, as well as in other process industries employing tube-type furnaces, it is desirable to monitor the temperature at various points inside the furnace, including the oil inside of the tubes (to detect plugging); for this purpose, thermocouples, mounted in thermal contact with the furnace tubes and connected to remote indicators and/or recorders, are commonly used.

According to prior practice, a metal block having a hole therethrough (to provide a thermocouple well) was welded directly to the outside of a furnace tube, and the thermocouple was secured in this well by constricting the well around the outside of thermocouple.

After use for some period of time, the thermocouple failed, and had to be replaced. In most if not all cases, this could not be done without replacing the entire block, since it was impossible to remove the thermocouple from the well without effectively destroying the usefulness of the well for the reception of another thermocouple. This effective destruction of the usefulness of the well was brought about by the fact that it was almost always necessary to redrill the hole (for the thermocouple well) before a new thermocouple could be inserted; this redrilling while the block is in place on the furnace tube (which is "blind" drilling) is an extremely difficult operation, because the furnace tubes must not be scored by the drill. Also, in some instances, the thermocouple block itself corroded to such an extent that it would have to be replaced in order to install another thermocouple.

The replacement of the metal blocks which becomes necessary (for whichever reason) involves considerable expense, as well as time, which becomes particularly disadvantageous when the blocks must be replaced frequently. In the first place, the replacement block must be welded to the furnace tube, and skilled welders are not always available at the appropriate time (e.g., when the furnace is shut down for repairs). In the next place (e.g., when the furnace tubes are made of low chrome steel, as is often the case), the tubes must be stress-relieved after the welding takes place, and this is a rather involved and time-consuming procedure, and is also costly, particularly when a large number of tubes must be so processed.

An object of this invention is to provide a novel construction for mounting thermocouples on furnace tubes.

Another object is to provide a thermocouple mounting assembly which allows quick and easy replacement of thermocouples, when this becomes necessary.

A further object is to provide a thermocouple mounting assembly which allows replacement of the thermocouple to be effected without any welding or stress-relieving operations.

The objects of this invention are accomplished, briefly, in the following manner: The mounting assembly of the invention comprises two separate members, a pocket member and a block member. The pocket member, which is adapted to be welded at its edges to the outside of a furnace tube and is thus intended to remain permanently in position once the assembly is installed, has an elongated groove in its inner face which, with the adjacent wall of the tube, provides a pocket. A block member is adapted to slide into this pocket, and thus is removably positioned in the pocket when the device is assembled. The block member has an inclined opening therethrough providing a thermocouple well, and at the time the device is assembled a thermocouple is secured in this opening. The pocket member has an inclined slot in its outer face which, when the device is assembled, is aligned with the thermocouple well, and thus provides in effect a continuation of this well. The block member is provided with an abutment which enables easy removal of this member from the pocket, when desired.

A detailed description of the invention follows, taken in conjunction with the accompanying drawing, wherein.

Figure 1:
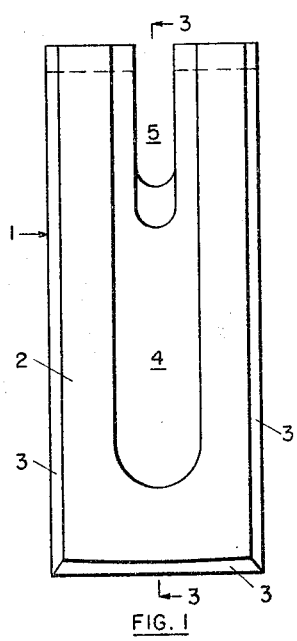
FIG. 1 is a face view of a pocket member, looking at the inner face thereof.
Figure 2:
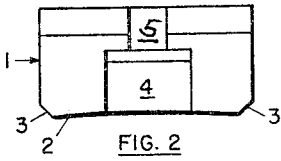
FIG. 2 is a top or elevation view of the pocket member.
Figure 3:
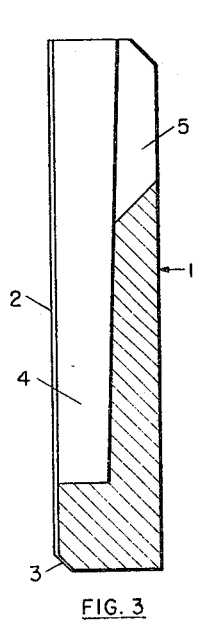
FIG. 3 is a vertical section taken on line 3—3 of FIG. 1.

First referring to FIGS. 1–3, an elongated pocket member denoted generally by numeral 1 is of substantially rectangular cross-section but has its inner vertically-extending face 2 machined on a radius (see FIG. 2) which is intended to substantially correspond to the outer radius of a furnace tube with which the mounting assembly is to be used. Also, the bottom and side edges of this inner face are beveled as at 3, to facilitate the welding of this member to the outer surface of a furnace tube.

A groove 4 is machined into the inner face of member 1, this groove extending from one end of the member (and thus being opened at this one end) downwardly for a substantial distance; by way of example, the groove may be 2⅛ inches in length, whereas the overall length of member 1 may be 2%6 inches. The bottom of groove 4 is semicircular, as shown in FIG. 1, and this groove has the cross-sectional shape of a U but with square corners (see FIG. 2). Groove 4 is tapered in depth, tapering from its maximum depth at the open end to its minimum depth at the closed or semicircular end (see FIG. 3). Groove 4 is intended to provide three of the four side walls of a pocket, the fourth wall being provided by the outer wall of a furnace tube which is immediately adjacent the inner face 2 when pocket member 1 is welded to this furnace tube, as will hereinafter appear.

Pocket member 1 has a slot 5 cut thereinto from the same end of this member into which groove 4 opens, slot 5 extending from the outer face of member 1 inwardly to groove 4. Slot 5 is narrower than groove 4, and has a width (⅜6 inch, by way of example) just sufficient to accommodate therein a thermocouple. The bottom of slot 5 is semicircular (see FIG. 1), and the bottom of this slot is inclined, such that the slot may be said to be deeper at its inner end, which is the end opening into groove 4. The inclination of this slot is such as to match that of the thermocouple well (opening 7) in a block member 6.

Figures 4, 5:
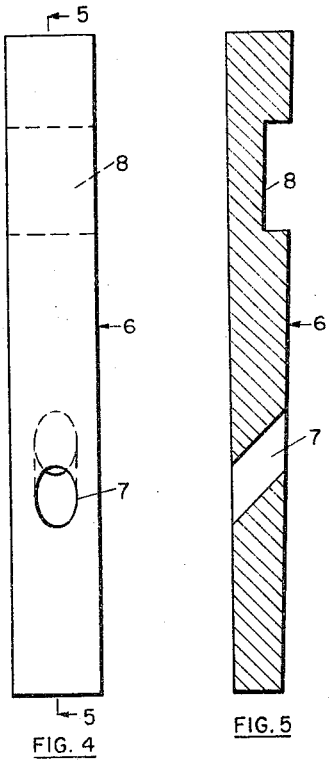
FIG. 4 is a front view of a block member.
FIG. 5 is a vertical section taken on line 5—5 of FIG. 4.

Now refer to FIGS. 4 and 5. An elongated block member 6 is of rectangular cross-section, having a width (see FIG. 4) such as to fit into groove 4 of pocket member 1, so that it can be slid into said groove (from the open end thereof) when pocket member 1 is in place on a furnace tube. That is to say, block member 6 is adapted to be removably positioned in groove 4 of pocket member 1. The thickness of member 6 (see FIG. 5) tapers from one end to the other thereof, to match the taper of the depth dimension of groove 4; the minimum thickness of member 6 is at the end thereof which is closer to the closed or semicircular end of groove 4, when member 6 is positioned in member 1.

Block member 6 has an opening 7 therethrough which provides a thermocouple well. This opening is drilled at an angle (i.e., it is inclined) to the transverse dimension of member 6, and may be, for example, $15/16$ inch from the lesser-thickness end of member 6 at the inner face of this member, and $1\frac{1}{4}$ inches from this same end of member 6 at the outer face of the member. Opening 7 has a diameter of $3/16$ inch, for example, in order to accommodate therein a thermocouple. When member 6 is inserted into the groove 4 of member 1, the closed end of slot 5 is aligned with opening 7, so that this closed end forms in effect a continuation of the thermocouple well 7.

By way of example, the overall length of member 6 may be $3\frac{1}{8}$ inches, and it may extend into groove 4, in the lengthwise direction, for only about two inches, so that when the device is assembled, member 6 extends beyond the open end of groove 4 for some little distance. A groove 8 is machined in this portion of member 6 which will extend beyond member 1 when the device is assembled, the edge of this groove providing an abutment (for application of a driving force) which enables member 6 to be loosened with respect to groove 4 of member 1, so that it may be removed therefrom. Groove 8 may extend across the entire width of member 6 (as illustrated in FIG. 4) and may be $\frac{1}{2}$ inch by $\frac{1}{8}$ inch.

Figure 6:
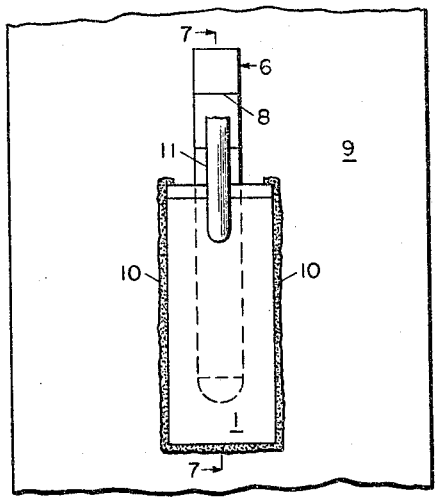
FIG. 6 is a front elevation of the thermocouple mounting assembly of the invention, illustrating the same in position on a furnace tube.
Figure 7:
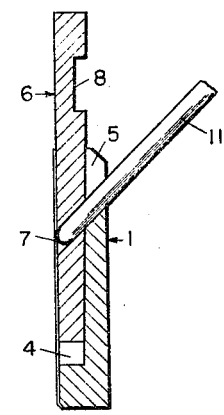
FIG. 7 is a section taken on line 7—7 of FIG. 6, but omitting the furnace tube.

Refer now to FIGS. 6 and 7. When the mounting assembly of this invention is to be initially installed, the inner face 2 of member 1 is positioned in contact with the outer wall of a furnace tube 9 on which the thermocouple is to be installed, with the open end of groove 4 upward or downward, as desired. Assume, for the purposes of the present description, that the said open end is upward. Then, pocket member 1 is welded in place on tube 9 by depositing weld metal (as at 10) along the two side edges, the bottom edge, and around the two upper corners of member 1. Thereafter, tube 9 may be stress-relieved in the usual manner.

Next, a thermocouple 11 is inserted into opening 7 of member 6 (member 6 not yet having been positioned in groove 4, but being at this time entirely separate and apart from member 1) from the front side of member 6, and, when the thermocouple has been positioned properly (so that its sensitive or junction end is just coplanar with the inner face of member 6), it is secured in member 6 by constricting well 7 therearound, that is, by peening the metal edge of opening 7 around the thermocouple.

Thereafter, the lower or smaller-thickness end of member 6 is inserted into the upper, open end of groove 4 (care being taken, of course, to position member 6 so that groove 8 and the thermocouple 11 face outwardly, away from the furnace tube 9), and member 6, with its attached thermocouple 11, is pushed or driven downwardly in groove 4 until thermocouple 11 comes into firm contact with the bottom (or closed, semicircular) end of slot 5. This automatically causes the sensitive or junction end of thermocouple 11 to be positioned in intimate thermal contact with the outer wall of furnace tube 9, and the thermocouple is then ready for operation. This is the assembled position of the device illustrated in FIGS. 6 and 7.

If necessary (although this is not illustrated), a band may be passed through groove 8 and around furnace tube 9, to assist in holding block member 6 in position in pocket member 1.

Once the pocket member 1 has been initially welded in place on tube 9 as described, and tube 9 has been initially stress-relieved, no further welding or stress-relieving is necessary when the thermocouple needs to be replaced; when this is necessary, the block member 6 can be easily removed and replaced without disturbing pocket member 1. For example, when it becomes necessary to replace the thermocouple 11, or if the block 6 becomes corroded and needs to be replaced, an upward driving force may be applied to the upper edge of groove 8 to loosen member 6, and the latter may then be readily pulled upwardly, out of groove 4, to separate member 6 from member 1, while leaving the latter in place. A new member 6, with its attached thermocouple, may then be easily inserted into the pocket formed by groove 4 and pushed downwardly into position, as before. The pocket member 1 remains welded in place during the replacement, and no more welding or stress-relieving needs to be done.

It will be appreciated that, when pocket member 1 is in place on furnace tube 9, one wall of the pocket for block 6 is provided by the outer wall of tube 9.

If desired, at the time of initial installation of the pocket member 1, an additional pocket member may be welded in place on furnace tube 9 as a spare, so that there would then be two pocket members on each tube. This spare pocket member could, at the time of initial installation, be covered with a material such as that known as "furnace mud," in order to protect it until such time as it is desired to be used.

By way of example, for use on furnace tubes made of two percent chrome steel, the members 1 and 6 could be machined from four percent chrome steel.

The invention claimed is:

1. A mounting assembly for thermocouples, comprising a first elongated member adapted to be secured to a support, said member having in one face thereof an elongated groove extending in a direction parallel to the length of said member and opening at one end thereof; and a second member removably positioned in said groove, said second member having an opening therethrough providing a thermocouple well; said first member also having therein a slot extending into said groove from that face of said first member opposite to said one face thereof, the closed end of said slot being aligned with said opening when said second member is positioned in said groove.

2. An assembly in accordance with claim 1, wherein said slot has a width such as to accommodate therein a thermocouple.

3. A mounting assembly for thermocouples, comprising a first elongated member having in one face thereof an elongated groove extending in a direction parallel to the length of said member and opening at one end thereof, said member being secured to a support in such a manner that one face of said member overlies said support substantially throughout its entire area; and a second member removably positioned in said groove, said second member having an opening therethrough providing a thermocouple well, one end of said opening in said second member being located immediately adjacent said support.

4. An assembly in accordance with claim 3, wherein said first member has therein a slot extending into said groove from that face of said first member opposite to said one face thereof, the closed end of said slot forming a continuation of said opening in an outward direction, away from said support.

5. An assembly in accordance with claim 3, wherein said first member has therein a slot extending into said groove from that face of said first member opposite to said one face thereof, said slot having a width such as to accommodate therein a thermocouple and the closed end of said slot forming a continuation of said opening in an outward direction, away from said support.

References Cited by the Examiner

UNITED STATES PATENTS

| | | | |
|---|---|---|---|
| 177,471 | 5/1876 | Clark | 248—224 |
| 1,564,642 | 12/1925 | Symons | 254—100 X |
| 1,711,725 | 5/1929 | Edwards et al. | 254—104 X |
| 2,444,705 | 7/1948 | Keffer | 248—354 X |
| 2,664,294 | 12/1953 | Kleinman | 280—11.27 X |
| 2,887,233 | 5/1959 | Bybee | 211—87 |
| 3,143,439 | 8/1964 | Hansen | 136—4 |

CLAUDE A. LE ROY, *Primary Examiner.*

CHANCELLOR E. HARRIS, J. F. FOSS,
*Assistant Examiners.*